US006810312B2

(12) United States Patent
Jammu et al.

(10) Patent No.: US 6,810,312 B2
(45) Date of Patent: Oct. 26, 2004

(54) METHOD FOR IDENTIFYING A LOSS OF UTILIZATION OF MOBILE ASSETS

(75) Inventors: Vinay Bhaskar Jammu, Niskayuna, NY (US); Charles Richard Unkle, Fairview, PA (US); Stephen Stoicovy, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/261,309

(22) Filed: Sep. 30, 2002

(65) Prior Publication Data

US 2004/0064225 A1 Apr. 1, 2004

(51) Int. Cl.[7] ................................................. G06F 7/00
(52) U.S. Cl. .............................. 701/29; 701/31; 701/34; 701/19; 702/182; 702/183; 702/184; 246/169 R
(58) Field of Search ................. 701/31, 34; 702/33–35, 702/57–59, 85–86, 90, 176–188; 700/28–34, 73–82; 714/1–2, 31–33, 25–26, 47–48; 246/167 R

(56) References Cited

U.S. PATENT DOCUMENTS

| | | | |
|---|---|---|---|
| 4,062,061 A | 12/1977 | Batchelor et al. | 714/47 |
| 4,270,174 A | 5/1981 | Karlin et al. | 701/115 |
| 4,322,813 A | 3/1982 | Howard et al. | 700/73 |
| 4,463,418 A | 7/1984 | O'Quinn, II et al. | 714/2 |
| 4,517,468 A | 5/1985 | Kemper et al. | 290/52 |
| 4,521,847 A | 6/1985 | Ziehm et al. | 700/79 |
| 4,695,946 A | 9/1987 | Andreasen et al. | 714/31 |
| 4,823,914 A | 4/1989 | McKinney et al. | 187/393 |
| 4,970,725 A | 11/1990 | McEnroe et al. | 714/25 |
| 4,977,390 A | 12/1990 | Saylor et al. | 340/521 |
| 5,023,817 A | 6/1991 | Au et al. | 702/183 |
| 5,113,489 A | 5/1992 | Cihiwsky et al. | 358/1.14 |
| 5,123,017 A | 6/1992 | Simpkins et al. | 714/26 |
| 5,127,005 A | 6/1992 | Oda et al. | 714/26 |
| 5,157,610 A | 10/1992 | Asano et al. | 701/32 |
| 5,274,572 A | 12/1993 | O'Neill et al. | 702/57 |
| 5,282,127 A | 1/1994 | Mii | 700/1 |

(List continued on next page.)

FOREIGN PATENT DOCUMENTS

EP 0332769 A1 * 9/1989 ............ G07C/5/08

OTHER PUBLICATIONS

Data–Tronic Gas Turbine Information And Control System; General Electric Gas Turbine Reference Library; 8 pp.
Trobec R. et al; "Optimization Of Diagnostic Examination"; Joint International Conference On Vector And Parallel PRocessing; Berlin De 1994, pp. 761–772, XP000974309.

Primary Examiner—Jacues H. Louis-Jacques
(74) Attorney, Agent, or Firm—Carl Rowold, Esq.; Norman A. Nixon, Esq.; Beusse Brownlee Wolter Mora & Maire, P.A.

(57) ABSTRACT

A method of servicing a mobile asset subject to utilization loss factors delaying the completion of servicing and the timely return of the asset to operation including identifying utilization loss factors that could delay the timely completion of servicing of the mobile asset. Identifying service procedures associated with each utilization loss factor and providing a database of events associated with the service procedures the events indicative of a status of completion of the procedures. A schedule may be established for at least one event for the timely completion of the respective service procedure. Monitoring the at least one event to determine when the event occurred relative to the scheduled time and if the at least one event is late, providing notice that the relevant utilization loss factor is likely to cause delay in the timely return of the asset to operation unless corrective action is taken. Operational parameters associated with the mobile asset may be remotely monitored while the asset is in-use to determine whether the mobile asset is in need of at least one of the repair, maintenance and/or other servicing procedures. If the mobile asset is in need of one of these procedures then a remote monitoring and diagnostic service center may schedule the procedure at a time and location to maximize the mobile asset's utilization.

44 Claims, 9 Drawing Sheets

U.S. PATENT DOCUMENTS

| | | | |
|---|---|---|---|
| 5,287,505 A | 2/1994 | Calvert et al. | 707/10 |
| 5,321,837 A | 6/1994 | Daniel et al. | 707/4 |
| 5,329,465 A | 7/1994 | Arcella et al. | 704/184 |
| 5,400,018 A | 3/1995 | Scholl et al. | 340/10.3 |
| 5,406,502 A | 4/1995 | Haramaty et al. | 702/183 |
| 5,445,347 A | 8/1995 | Ng | 246/169 R |
| 5,463,768 A | 10/1995 | Cuddihy et al. | 714/37 |
| 5,508,941 A | 4/1996 | Leplingard et al. | 709/224 |
| 5,528,516 A | 6/1996 | Yemini et al. | 702/181 |
| 5,566,091 A | 10/1996 | Schricker et al. | 702/34 |
| 5,594,663 A | 1/1997 | Messaros et al. | 702/184 |
| 5,596,712 A | 1/1997 | Tsuyama et al. | 714/26 |
| 5,633,628 A | 5/1997 | Denny et al. | 340/584 |
| 5,638,296 A | 6/1997 | Johnson et al. | 702/286 |
| 5,661,668 A | 8/1997 | Yemini et al. | 702/86 |
| 5,666,481 A | 9/1997 | Lewis | 714/4 |
| 5,666,534 A | 9/1997 | Gilbert et al. | 713/1 |
| 5,678,002 A | 10/1997 | Fawcett et al. | 345/709 |
| 5,680,541 A | 10/1997 | Kurosu et al. | 714/26 |
| 5,729,452 A | 3/1998 | Smith et al. | 701/29 |
| 5,742,915 A | 4/1998 | Stafford | 455/456.1 |
| 5,774,645 A | 6/1998 | Beaujard et al. | 714/25 |
| 5,790,780 A | 8/1998 | Brichta et al. | 714/46 |
| 5,799,148 A | 8/1998 | Cuddihy et al. | 714/26 |
| 5,815,071 A | 9/1998 | Doyle | 340/439 |
| 5,835,871 A | 11/1998 | Smith et al. | 701/29 |
| 5,845,272 A | 12/1998 | Morjaria et al. | 706/50 |
| 5,862,316 A | 1/1999 | Hagersten et al. | 714/15 |
| 5,928,369 A | 7/1999 | Keyser et al. | 714/47 |
| 5,950,147 A | 9/1999 | Sarangapani et al. | 702/179 |
| 5,956,664 A | 9/1999 | Bryan | 702/184 |
| 5,963,911 A * | 10/1999 | Walker et al. | 705/7 |
| 6,052,631 A | 4/2000 | Busch et al. | 701/29 |
| 6,078,851 A | 6/2000 | Sugitani | 701/34 |
| 6,144,901 A | 11/2000 | Nickles et al. | 701/19 |
| 6,175,934 B1 | 1/2001 | Hershey et al. | 714/25 |
| 6,216,066 B1 | 4/2001 | Goebel et al. | 701/29 |
| 6,243,628 B1 | 6/2001 | Bliley et al. | 701/29 |
| 6,246,950 B1 | 6/2001 | Bessler et al. | 701/99 |
| 6,263,265 B1 | 7/2001 | Fera | 701/19 |
| 6,301,531 B1 | 10/2001 | Pierro et al. | 701/29 |
| 6,324,659 B1 * | 11/2001 | Pierro | 714/48 |
| 6,330,499 B1 * | 12/2001 | Chou et al. | 701/33 |
| 6,336,065 B1 | 1/2002 | Gibson et al. | 701/29 |
| 6,338,152 B1 | 1/2002 | Fera et al. | 704/48 |
| 6,343,236 B1 | 1/2002 | Gibson et al. | 700/73 |
| 6,345,257 B1 | 2/2002 | Jarrett | 705/1 |
| 6,347,267 B1 * | 2/2002 | Murakami | 701/35 |
| 6,377,876 B1 | 4/2002 | Hedeen et al. | 701/19 |
| 6,405,108 B1 | 6/2002 | Patel et al. | 701/29 |
| 6,415,395 B1 * | 7/2002 | Varma et al. | 714/37 |
| 6,636,771 B1 * | 10/2003 | Varma et al. | 700/79 |
| 2002/0065698 A1 | 5/2002 | Schick et al. | 705/1 |

* cited by examiner

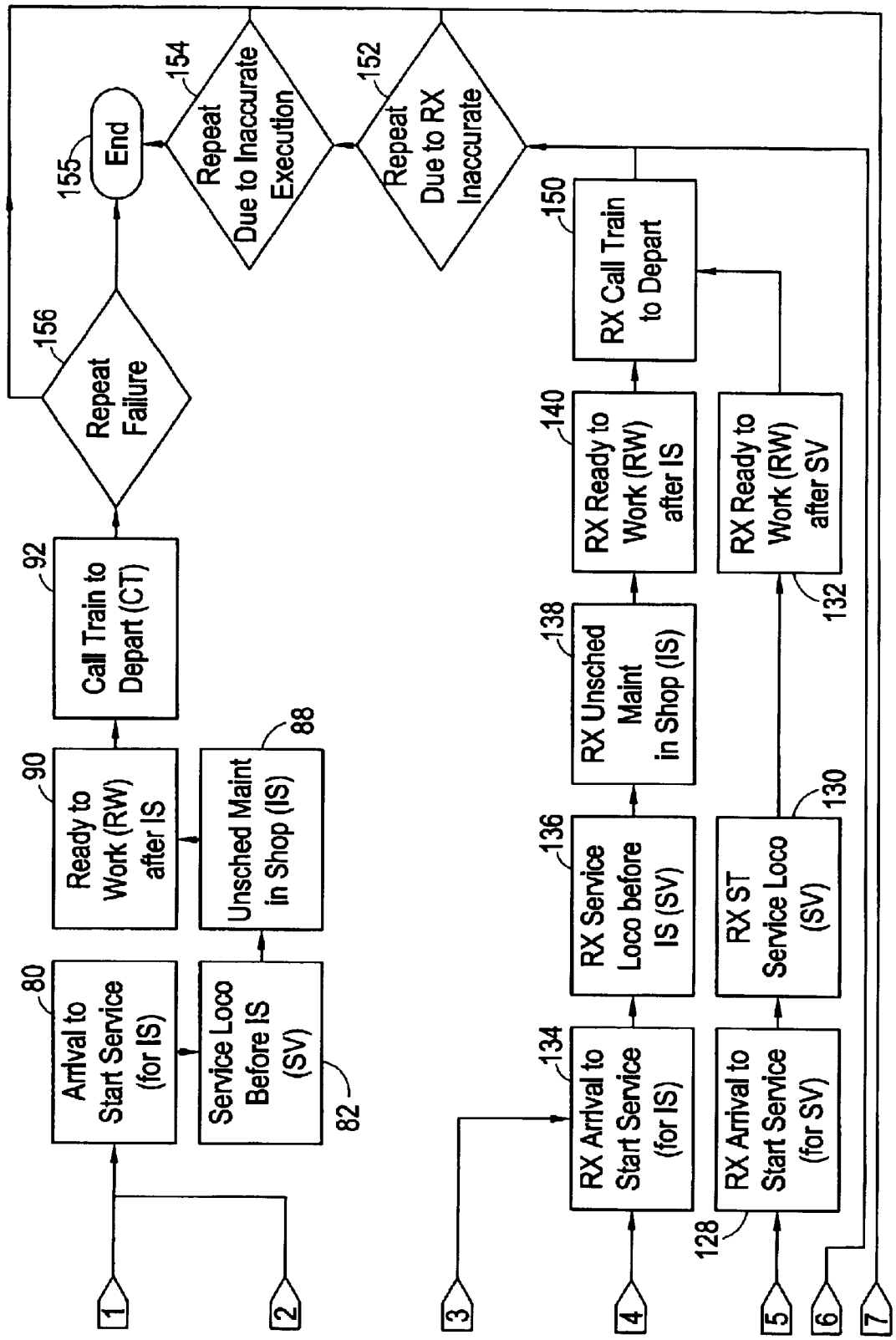

METHOD FOR IDENTIFYING A LOSS OF UTILIZATION OF MOBILE ASSETS

BACKGROUND OF THE INVENTION

This invention relates generally to a method and system for monitoring the performance of generally complex equipment, and, more particularly, to a computer-based method and system for servicing a mobile asset subject to utilization loss factors delaying the completion of servicing and the timely return of the asset to operation.

The diagnosis, repair, maintenance and/or other servicing of generally complex equipment, such as mobile assets that may include on-road or off-road vehicles, ships, airplanes, railroad locomotives, trucks, and other forms of complex equipment including industrial equipment, consumer appliance equipment, medical imaging equipment, equipment used in industrial processes, telecommunications, aerospace applications, power generation, etc., involves extremely complex and time consuming processes. In the case of transportation equipment, the efficient and cost-effective operation of a vehicle or fleet of vehicles demands minimization of the number of vehicle failures while in use, minimization of vehicle downtime and the expeditious and accurate performance of diagnostic, repair, maintenance and/or other services to the vehicles. Diagnosing problems associated with mobile assets is frequently performed by trained technicians after the problem has occurred and is completed with the mobile asset in a servicing facility.

One approach for conducting the maintenance and repair of complex, mobile assets involves diagnosing problems after they occur then performing repairs and/or maintenance services as quickly and accurately as possible after the diagnosis is completed. Diagnosing problems and performing the associated maintenance and repairs may involve rather complex processes and procedures when performed in association with major land vehicles, such as locomotives for example. Consequently, waiting for a mobile asset to arrive at a servicing facility before beginning the diagnosis does not provide a service technician with any lead time for planning the use of facilities for performing work on the asset, scheduling personnel to perform the work, ordering parts, etc.

Inefficiencies in diagnosing problems and planning performance of the associated work, for example, may lead to a loss of utilization of that asset. Also, if a mobile asset is detained in any phase of the repair and/or maintenance process longer than is projected then that asset's return to service may be delayed, leading to a loss of utilization. Similarly, some assets may experience an above average volume of repeatedly malfunctioning behavior that is not effectively cured for indeterminable reasons. Such assets may need to be in a repair and/or maintenance phase with a higher frequency than similarly configured and situated assets due to their repeated malfunctioning. This may lead to the repeatedly malfunctioning asset causing a loss of utilization. Other factors may contribute to a loss of utilization as a function of the events associated with an asset type. Any asset type, such as a fleet of locomotives or a type of locomotive within a fleet, experiencing or causing a loss of utilization may cause a significant economic loss to the operator of the fleet that the operator would rather avoid.

It is known that some mobile assets, such as a locomotive for example, may incorporate on-board sensors that may continually monitor on-board operational parameters of systems, subsystems and/or other components of the asset while in operation. The on-board system may also log fault data or other fault indicators when anomalous operating conditions arise. A technician may study the fault log and/or indicators after a locomotive has arrived in a service yard to identify the nature of the problem and determine whether a repair and/or maintenance service is necessary. Conducting the diagnostics at the service yard may extend the overall amount of time the vehicle is out of service. This may be due to repair and/or maintenance facilities being unavailable when needed due to scheduling conflicts and/or the necessary personnel not being available to perform the required maintenance and/or repair services, for example.

BRIEF DESCRIPTION OF THE INVENTION

A method of servicing a mobile asset subject to utilization loss factors delaying the completion of servicing and the timely return of the asset to operation is provided, which comprises identifying utilization loss factors that could delay the timely completion of servicing of the mobile asset, identifying service procedures associated with at least one utilization loss factor, providing a database of events associated with the service procedures indicative of a status of completion of the procedures, establishing a schedule for at least one event for the timely completion of the respective service procedure, monitoring said at least one event to determine when the event occurred relative to said scheduled time and if the at least one event is late, providing notice that the relevant utilization loss factor is likely to cause delay in the timely return of the asset to operation unless corrective action is taken.

One aspect allows for identifying utilization loss factors that could delay the timely completion of servicing of the mobile asset, identifying service procedures associated with at least one utilization loss factor, providing a database of conditions associated with each service procedure that are needed at a servicing site for the timely completion of the service procedure, monitoring the conditions in preparation of the initiation of the respective service procedure to confirm that the conditions have been met and if a condition is not met, providing notice that the relevant utilization loss factor is likely to cause delay in the timely return of the asset to operation unless corrective action is taken.

Another aspect allows for identifying utilization loss factors that could delay the timely completion of servicing of the mobile assets, identifying service procedures associated with at least one utilization loss factor, providing a database of events associated with the service procedures indicative of an incorrect diagnosis of the servicing required to return the asset to service, monitoring the events to determine the number of times they occur and if the number of times the events occur is greater than a predetermined number, providing notice that the relevant utilization loss factor is likely to cause delay in the timely return of the asset to operation unless corrective action is taken.

Another aspect allows for identifying utilization loss factors that could delay the timely completion of servicing of the mobile asset, identifying service procedures associated with at least one utilization loss factor, providing a database of events associated with the service procedure requiring the movement of the mobile asset to a predetermined location relative to a servicing site at times set for the occurrence of events, monitoring the position of the mobile asset relative to the servicing site and relative to the times set for the events and if the mobile asset is not in the predetermined position at the time set for an event, providing notice that the relevant utilization loss factor is likely to cause delay in the timely return of the asset to operation unless corrective action is taken.

The ability to monitor and identify vehicles that may experience a loss of utilization allows for maintaining the efficient operation and utilization of a vehicle or fleet of vehicles such as a locomotive or locomotives in a train consist, for example. One aspect allows for a notification to be sent to appropriate personnel managing a servicing procedure, such as the repair, maintenance and/or servicing of a locomotive, indicating that an event has occurred or not occurred that may cause a loss of utilization of the vehicle undergoing a servicing procedure. Notices, such as alarms for example, may be logged within a processor that may be indicative of these events. Appropriate corrective action may be taken by the service technician, or other personnel, in response to the logged alarms in order to minimize or prevent the loss of utilization.

BRIEF DESCRIPTION OF THE DRAWINGS

The present invention can be more easily understood and the further advantages and uses thereof more readily apparent, when considered in view of the description of various exemplary embodiments and the following figures in which:

FIG. 6B is a continuation of the diagram of FIG. 6A.

DETAILED DESCRIPTION OF THE INVENTION

Figure 1:
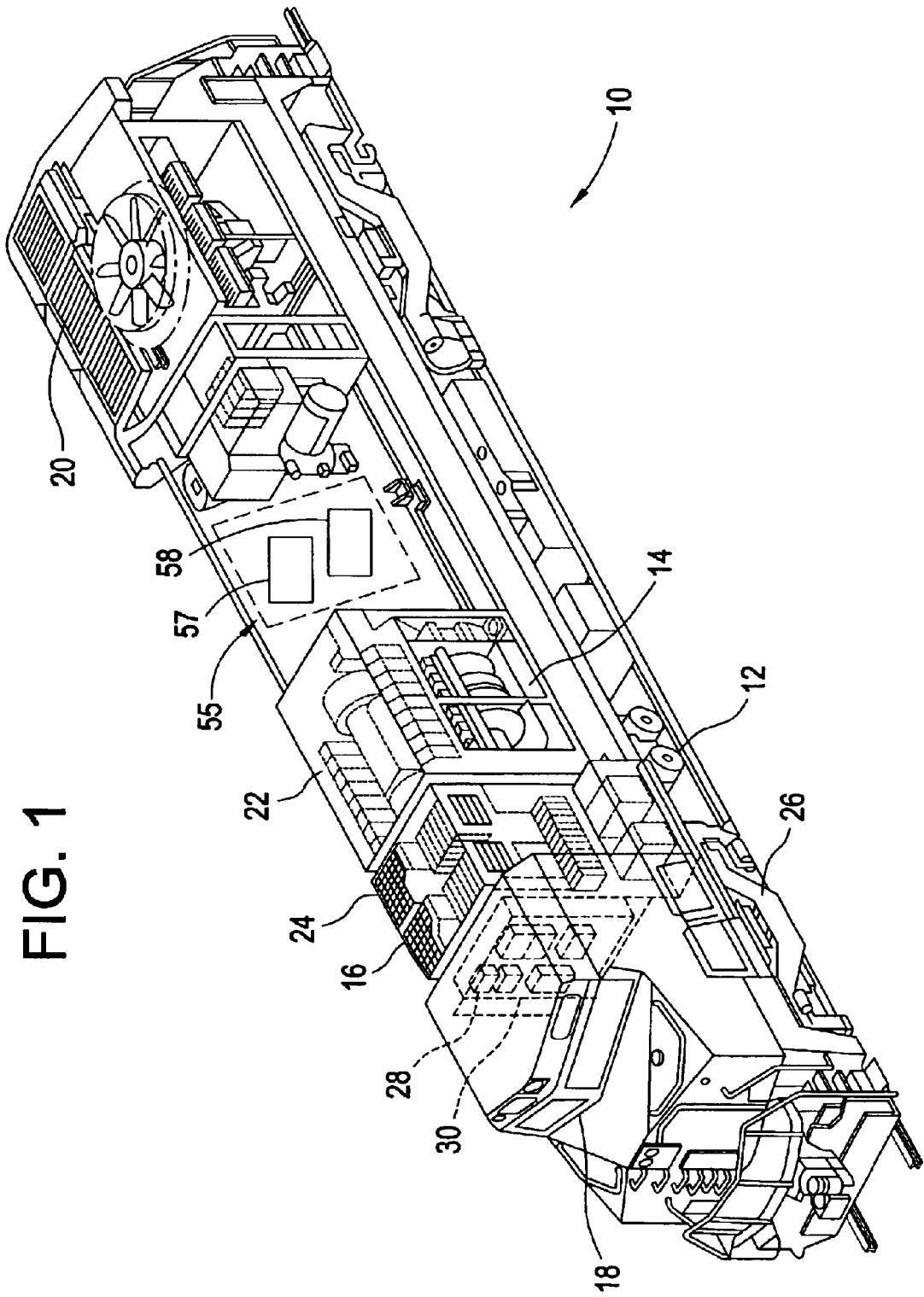
FIG. 1 is a schematic perspective view of a locomotive.

FIG. 1 illustrates a schematic of a locomotive 10 having exemplary systems and subsystems that may be remotely monitored. Locomotive 10 may include a plurality of such systems and subsystems such as an air and air brake subsystem 12, an auxiliary alternator subsystem 14, a battery and cranker subsystem 16, a cab signal subsystem 18, an engine cooling subsystem 20, an equipment ventilation subsystem 22, a propulsion subsystem 24, a traction alternator subsystem 26, a locomotive control system 28 and an on-board diagnostics subsystem 30. It will be appreciated by those skilled in the art that the locomotive 10 may comprise many other systems and subsystems and that the present invention is not limited to those disclosed herein for purposes of example. The above-mentioned systems and subsystems may be monitored by a locomotive control system 28, which may keep track of any incidents occurring in the systems and/or subsystems with an incident log. The on-board diagnostics subsystem 30 may receive information from the incident log, analyze that data and transmit it to a wayside processor for further analysis including further diagnosis of any problems with the locomotive 10 and issuing recommended fix instructions based on the diagnosis.

Figure 2:
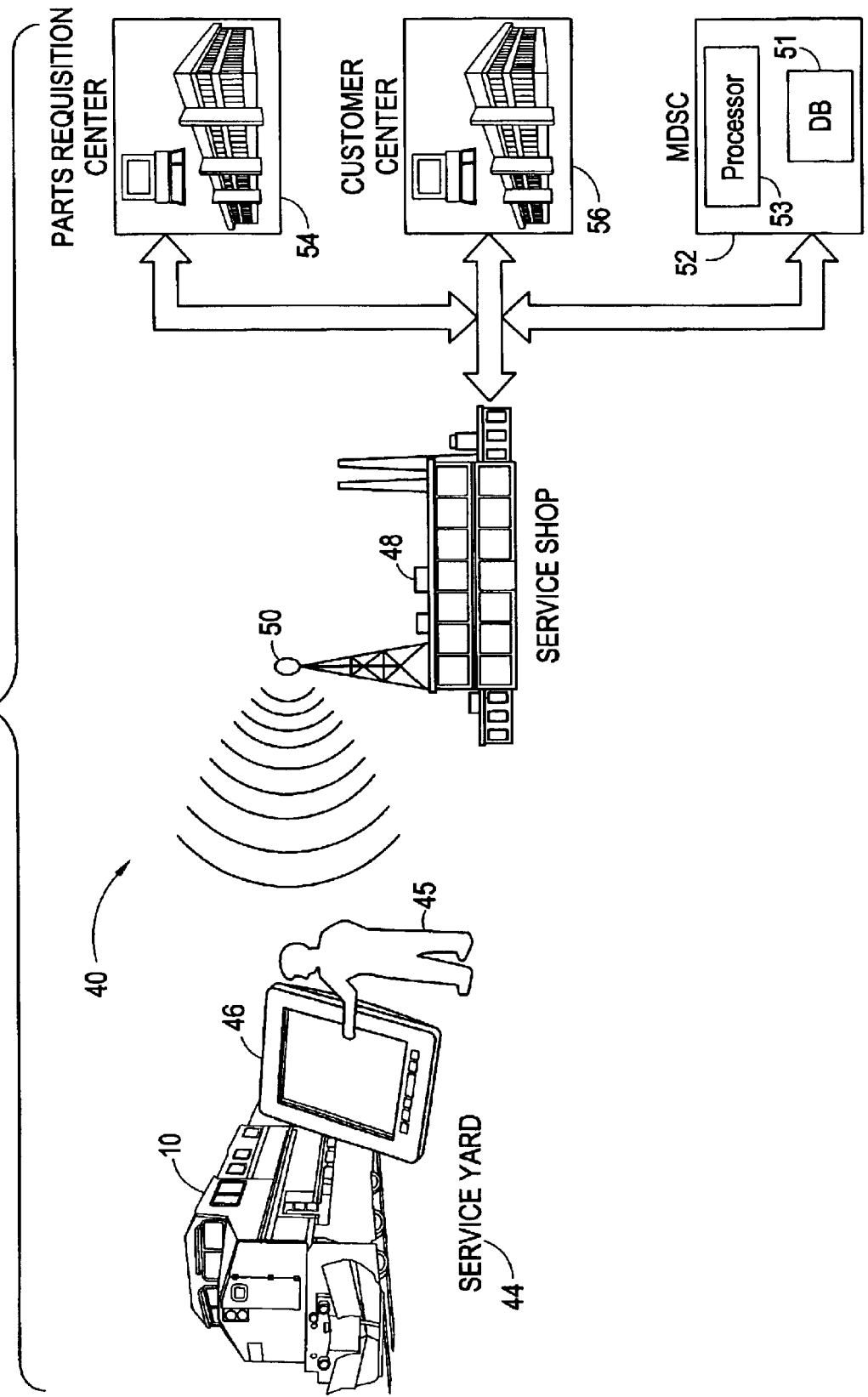
FIG. 2 is a pictorial rendering showing exemplary elements of a locomotive servicing facility and processes.

FIG. 2 is a schematic representation of an exemplary system 40. Although illustrated and described with respect to the railroad locomotive 10, those skilled in the art will understand that the teachings of the present invention are applicable to many types of equipment, including those which may be part of a large fleet, such as trucks, ships, off-road vehicles, airplanes, etc. The locomotive 10, such as may be parked at a railroad service yard 44, may be serviced by a technician 45 or other service personnel. The technician 45 may use a portable unit 46 that may communicate with a railroad service shop 48 having an antenna 50 via any of various well-known wireless or wired communication systems and protocols, including an Internet connection using the TCP/IP protocols, tone modems, ISDN or XDSL protocols over the public switched telephone network or a cable modem. In one exemplary embodiment, the technician 45 may access information stored in a database 51 located at a monitoring and diagnostic service center 52 ("MDSC"). The database 51 may be accessed via the portable unit 46 over a telecommunications network, such as the Internet, for example. It will be appreciated that other network configurations may be used. For example, an intranet may be configured among the portable unit 46, the service shop 48 and the MDSC 52 and may allow for the exchange of data associated with the repair, maintenance and/or other servicing of the locomotive 10. The MDSC 52 may include a conventional processor 53 configured to execute custom software modules developed by the assignee of the present invention for performing remote monitoring and diagnostics analysis and for making repair, maintenance and/or other servicing recommendations associated with the systems, subsystems and/or other components of locomotive 10. These custom modules may include Artificial Intelligence-based problem detection and diagnosis tools such as Java Data Pack Anomaly Detection for identifying abnormal conditions in the mobile asset. They may also include Case Based Reasoning and Bayesian Belief networks for identifying root cause of the problem so specific tasks could be identified to fix the problem. The processor 53 may also be configured to execute commercial off-the-shelf ("OTS") software applications.

Repair, maintenance, diagnostic, scheduling, parts, contractual and warranty information, and/or recommended fix instruction information associated with the locomotive 10, for example, may be exchanged among the portable unit 46, the MDSC 52, the railroad service shop 48, a parts requisition center 54 and/or a customer center 56. Generally, the parts requisition center 54, the customer center 56, and the MDSC 52 are located remote from the service shop 48 and the service yard 44. In one exemplary aspect of the present invention, the portable unit 46 and/or processor 53 may remotely interrogate an on-board monitoring and diagnostic system 55 of the locomotive 10. In an alternate embodiment, the system 55 may periodically transmit data to the portable unit 46 and/or processor 53, for example, without being interrogated, or otherwise transmit data on command by an end user on the locomotive 10. The on-board system 55 may include a processor 57 configured with executable software for monitoring a set of operational parameters associated with the systems, subsystems and/or other components of the locomotive 10. Processor 57 may detect and log faults, anomalous conditions and other information associated with a problem or abnormal operating condition of systems, subsystems and/or other components of the locomotive 10. This data may be stored directly in a database 58 aboard locomotive 10 and/or transmitted to the MDSC 52, for example, over known telecommunications mediums where it may be stored on database 51. It will be recognized by those skilled in the art that selected data sets associated with the operational parameters of locomotive 10 may be selectively transmitted from the locomotive 10 over a telecommunications medium, such as the Internet or a wireless connection, to a centralized processor and database such as processor 53 and database 51 of the MDSC 52. Data transmission rates, bandwidth of the telecommunications medium, criticality of the data and other factors may influence what data set is selected to be transmitted and with what frequency. Database 51 may contain historical repair and diagnostics data pertaining to a locomotive or fleet of locomotives that may be used to diagnose current problems associated with locomotive 10. Recommended fix instructions may be issued based on diagnostics using this historical data and/or other diagnostic techniques such as proprietary techniques developed by the assignee of the present invention.

When locomotive 10 is in the service yard 44 the technician 45 may use the portable unit 46 to gain access to database 51 and consequently to a wide range of repair, diagnostic, and operational information that may be needed to efficiently and accurately trouble-shoot and diagnose problems associated with locomotive 10 and undertake the necessary repairs. The portable unit 46 may also access on-board database 58 and download repair recommendations generated by analysis software and/or locomotive repair experts at the MDSC 52. Repair experts may provide individualized assistance to the technician 45 via the portable unit 46, using an instant messaging feature incorporated therein, for example. Problem resolution suggestions, repair actions and/or scheduling issues can be determined prior to arrival of the locomotive 10 at the service yard 46 or they can be determined in real time after arrival of locomotive 10 by experts at the MDSC 52, for example, and immediately transmitted to the portable unit 46. The repair technician 45 may also provide visual information back to the MDSC 52 (over an Internet connection, for example) using a camera attached to the portable unit 46. Still or video images can be provided by such a camera. The video information may also be accompanied by live audio information (as spoken by the technician), thereby allowing the technician 45 to communicate with personnel at the MDSC 52 to confer about a particular problem or repair action. Upon completion of the repair, the portable unit 46 generates a feedback report describing the nature of the problem and the repair actions taken. This report may be sent to the MDSC 52, where it may be included with a repair history for that locomotive 10, for example.

Operators of locomotives or fleets of locomotives such as locomotive 10 are desirous of maximizing the utilization of the locomotives to be cost effective and competitive in the marketplace. Maximizing utilization of a locomotive may depend at least in part on performing preventative maintenance and/or repair of systems, subsystems or other aspects of the locomotive 10. Experts at the MDSC 52 may determine that a given system, subsystem and/or other component of the locomotive 10 may be on an imminent path toward near-term failure based on information pertaining to the locomotive's 10 operational parameters downloaded from the locomotive 10. In such a case, it is desirable for the technician 45 or other personnel to schedule a repair, replacement and/or other maintenance or servicing of the failing component to avoid locomotive's 10 failure while it is in operation. Repair, maintenance and/or other service procedures may be planned in advance to occur on a predetermined schedule. Such planned maintenance and/or repair procedures may be based on objective criteria such as, for example, the number of locomotive 10 service hours or the number of miles it has traveled since the last such action. Locomotive 10 failures while in service are very costly and inefficient for railroad operations because the locomotive 10 and the train consist may have to be moved back to the service yard 44 to undertake the required repairs and/or maintenance. Clearly, this is an expensive and disruptive effort for railroad operations.

Maximizing the utilization of locomotives 10 and/or their associated consists may be achieved by providing the MDSC 52 with the ability, through appropriately configured hardware and software, to remotely monitor operational parameters of locomotive 10 during its operation. This may be accomplished by monitoring and collecting a variety of on-board sensor data and by using advanced artificial intelligence tools to identify failures and/or potential failures with a system, subsystem and/or other component of locomotive 10. The processor 53 at the MDSC 52 may also be configured with expert systems, artificial intelligence tools, and case-based reasoning tools that may be used to develop specific repair or fix recommendations that may be stored in associated database 51. In one exemplary embodiment, the MDSC 52 may identify failures of locomotive 10 in a sufficient amount of time to allow personnel associated with the service yard 44 to determine the optimum location for servicing the locomotive such as a location within the service yard 44, for example. The service personnel may choose an optimum servicing location to perform any necessary repair, maintenance and/or other servicing events to the locomotive 10 quickly and efficiently. This may contribute to maximizing that locomotive's 10 utilization rate.

The service yard 44 may include at least three distinct servicing locations for performing repair, maintenance and/or other services on locomotive 10. A first location may be a "run-thru" location, which is a location within the service yard 44 where locomotive 10 may be serviced while remaining attached to a train consist. The locomotive 10 may be considered to be "utilized" while undergoing service at the "run-thru" location. A second servicing location may be a "service track" location, which is a location at the service yard 44 where locomotive 10 may be repaired and/or serviced after being separated from a train consist. The locomotive is considered to be "unutilized" while undergoing servicing at the "service track" location. A third servicing location may be a "shop" location, which is a location at the service yard 44 where locomotive 10 may be repaired and/or serviced after being separated from a train consist. The locomotive 10 may be considered to be "unutilized" while undergoing servicing at the "shop" location. In alternate embodiments, the "run-thru", "service track" and/or "shop" locations may be separate from the service yard 44 depending on the availability of locations for servicing the locomotive 10 and/or the availability of properly trained service technicians as well as other factors. The locomotive 10 may typically undergo major repairs and/or overhauls at the "shop" location and may be considered to be "unutilized" while undergoing service at the "shop" location. In general, a locomotive 10 is defined as being not utilized when it is cut or separated from a train consist for repair, maintenance and/or other services. In alternate embodiments, a locomotive 10 may be classified as being "utilized" or "unutilized" in various manners.

Figure 3:
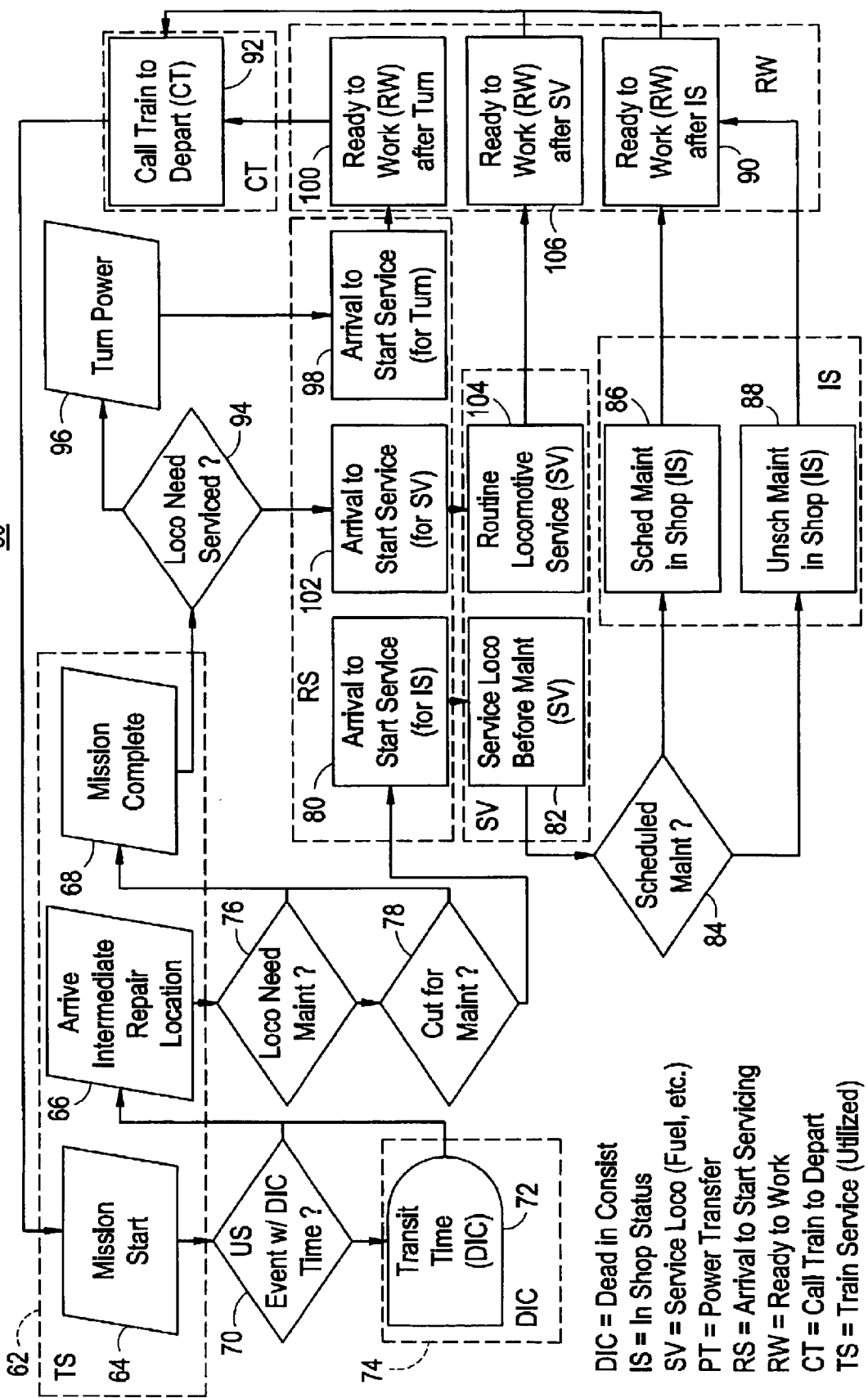
FIG. 3 is a flow diagram of one exemplary embodiment of a method for managing the use, maintenance and repair of a fleet of mobile assets.

FIG. 3 illustrates an exemplary flow chart of a method for managing the use, maintenance and repair of a fleet of mobile assets. One aspect of the method is depicted as a locomotive's 10 utilization process map 60. The map 60 illustrates various factors that may contribute to a loss of utilization of a vehicle, such as a locomotive 10, for example. In one exemplary embodiment these factors may represent a discrete event or events and may include:

1) Dead in Consist ("DIC")
2) In Shop Status ("IS")
3) Service Loco ("SV")
4) Power Transfer ("PT")
5) Arrival to Start Servicing ("RS")
6) Ready to Work ("RW")
7) Call Train to Depart ("CT")

Alternate embodiments may include other factors as a function of the type of mobile asset and customer needs, for example. Utilization map 60 also illustrates exemplary steps involved from the starting of a locomotive 10 mission to finishing the mission including the possible maintenance and/or repair process associated with the locomotive 10 during the mission. A typical mission may include the transport of goods between two metropolitan areas over a rail system, for example. Intermediate stops may be made along the way for fuel, possible change of crews and/or goods and the dropping off or adding of cars to the train consist. Utilization map 60 illustrates the interrelationship among the loss of utilization factors and the association of these factors to discrete events within a vehicle's mission. For example, the Train Service ("TS") factor 62 may represent events where the locomotive 10 is considered to be utilized and may be associated, for example, with a mission start step 64, an intermediate repair step 66 and a mission complete step 68. A vehicle such as locomotive 10 may be designated as being utilized when engaged in one of the steps 64, 66 and/or 68. After the mission start step 64 one embodiment allows for determining whether a locomotive in a consist, for example, is Dead in Consist ("DIC") in step 70. Dead in Consist may reference a malfunctioning locomotive 10 in a consist that includes more than one locomotive. The consist will continue even with a Dead in Consist provided the other locomotive has the power to pull the train. If there is no vehicle in a consist classified as Dead in Consist then the train consist may continue on its mission and arrive at an intermediate repair location designated in step 66. If a vehicle such as a locomotive 10 is classified as Dead in Consist ("DIC") then step 72 allows for determining a transit time associated with that vehicle. A Dead in Consist ("DIC") factor 74 may be associated with step 72 and the vehicle may be considered to be unutilized even though it has not yet been cut or separated from the train consist, for example.

The method of FIG. 3 allows for, in step 76, determining whether a locomotive 10 needs maintenance after arriving at the intermediate repair location of step 66. For example, it may be determined that the locomotive 10 is not producing power in all of its axles or other events may be detected causing the locomotive 10 to need maintenance. This may be accomplished by analyzing data collected by on-board sensors during the mission and/or analyzing historical data to determine whether locomotive 10 is due for maintenance. Maintenance determinations may also be made remotely by transmitting data to the MDSC 52 for diagnosis and maintenance recommendations. In an alternate embodiment the intermediate repair location of step 66 may be located at the end of a locomotive's 10 mission such as when the mission is a relatively short distance. If the locomotive 10 does not need maintenance in step 76 then it may proceed to complete its mission in step 68. If the locomotive 10 is in need of maintenance then step 78 allows for determining whether the locomotive 10 should be cut or separated from the train consist for maintenance. Determining whether to cut the locomotive 10 may be a function of several factors such as available manpower, criticality of the failure, type of failure or capability at the current location of the train consist of which locomotive 10 is a part. If locomotive 10 is in need of maintenance but does not need cut for maintenance then the work may be performed while locomotive 10 is part of the train consist. On completion of the maintenance the locomotive 10 may then proceed on its mission to completion in step 68. If the locomotive 10 is cut for maintenance it may then be transported in step 80 to a location in step 82 where service may be performed prior to the locomotive 10 being placed "in-shop" for maintenance. The locomotive 10 may be transported in step 80 to at least one of the distinct servicing locations of service yard 44 such as, for example, the "run-thru" and/or "service track" locations. The locomotive 10 may be transported to at least one of these locations as a function of the service to be performed. Step 82 allows for servicing the locomotive 10 prior to performing maintenance services at the "in-shop" servicing location. In an alternate embodiment the locomotive 10 may be transported in step 80 directly to the "in-shop" servicing location rather than one of the "run-thru" or "service track" locations depending on the repair and/or maintenance to be performed on the locomotive 10.

After locomotive 10 is serviced in step 82, step 84 allows for determining whether maintenance to be performed on the locomotive 10 is scheduled or unscheduled. This may be determined, for example, by personnel at the MDSC 52 and may be communicated over a telecommunications medium to personnel in the service yard 44 managing the maintenance procedures of the locomotive 10. It may alternatively be determined by reviewing data on-board locomotive 10, for example that may indicate an acute failure of a system, subsystem and/or other component of the locomotive 10 that occurred during its mission and caused a decision to be made by authorized personnel that it be transported to the "in-shop" location for unscheduled maintenance. Steps 86 and 88 allow for scheduled and unscheduled maintenance, respectively, to be performed on the locomotive 10 while it's "in-shop". Steps 86 and 88 may be classified as In Shop Status ("IS") maintenance events. On completion of maintenance in step 86 and/or 88 the locomotive 10 may be transported in step 90 to a service yard 44 or other location where it may be classified as being Ready to Work ("RW") after In Shop Status ("IS"). The Ready to Work ("RW") status of the locomotive 10 may then be communicated to personnel at the MDSC 52 or other personnel responsible for scheduling the locomotive's 10 return to work. Step 92 allows for the locomotive 10 to receive a Call Train to Depart ("CT") signal and/or communication and the locomotive 10 may be transported in step 64 to a mission start location to begin a new mission.

Returning to steps 76 and 78, a locomotive 10 may continue on its mission to the mission complete step 68 if the locomotive does not need maintenance in step 76. If the locomotive 10 needs maintenance but is not cut for maintenance in step 78 then it may proceed to mission compete step 68 after maintenance is performed with the locomotive 10 remaining on the train consist. After the locomotive's mission has been completed in step 68, step 94 allows for determining if the locomotive 10 needs to be serviced. If not, the locomotive 10 may proceed to step 96 Turn Power then onto step 98 that allows for the locomotive 10 to be transported to a location to start service for Turn. On completion of the service for Turn in step 98, step 100 allows for the locomotive 10 to be transported to a location in the service yard 44, for example, where it is designated as being Ready to Work after Turn. The Ready to Work after Turn status of the locomotive 10 may then be communicated to personnel at the MDSC 52 or other personnel responsible for scheduling the locomotive's 10 return to work. The locomotive 10 may then receive a Call Train to Depart signal and/or communication in step 92 and the locomotive 10 may then be transported to a location to begin a new mission in mission start step 64. Returning to step 94, if it is determined that the locomotive 10 needs to be serviced in step 94 then step 102 allows for the locomotive 10 to be transported to a location in the service yard 44, for example, such as the "run-thru" and/or "service track" locations so that Routine Locomotive Service may be performed on the locomotive 10 in step 104. After routine service in step 106, the locomotive 10 may be transported to a location where the locomotive 10 may be classified as Ready to Work after Service Loco. The Ready to Work after Service Loco status of the locomotive 10 may then be communicated to personnel at the MDSC 52 or other personnel responsible for scheduling the locomotive's 10 return to work. The locomotive 10 may then receive a Call Train to Depart signal and/or communication in step 92 and the locomotive 10 may then be transported in to a location to begin a new mission in mission start step 64.

Figure 4A:
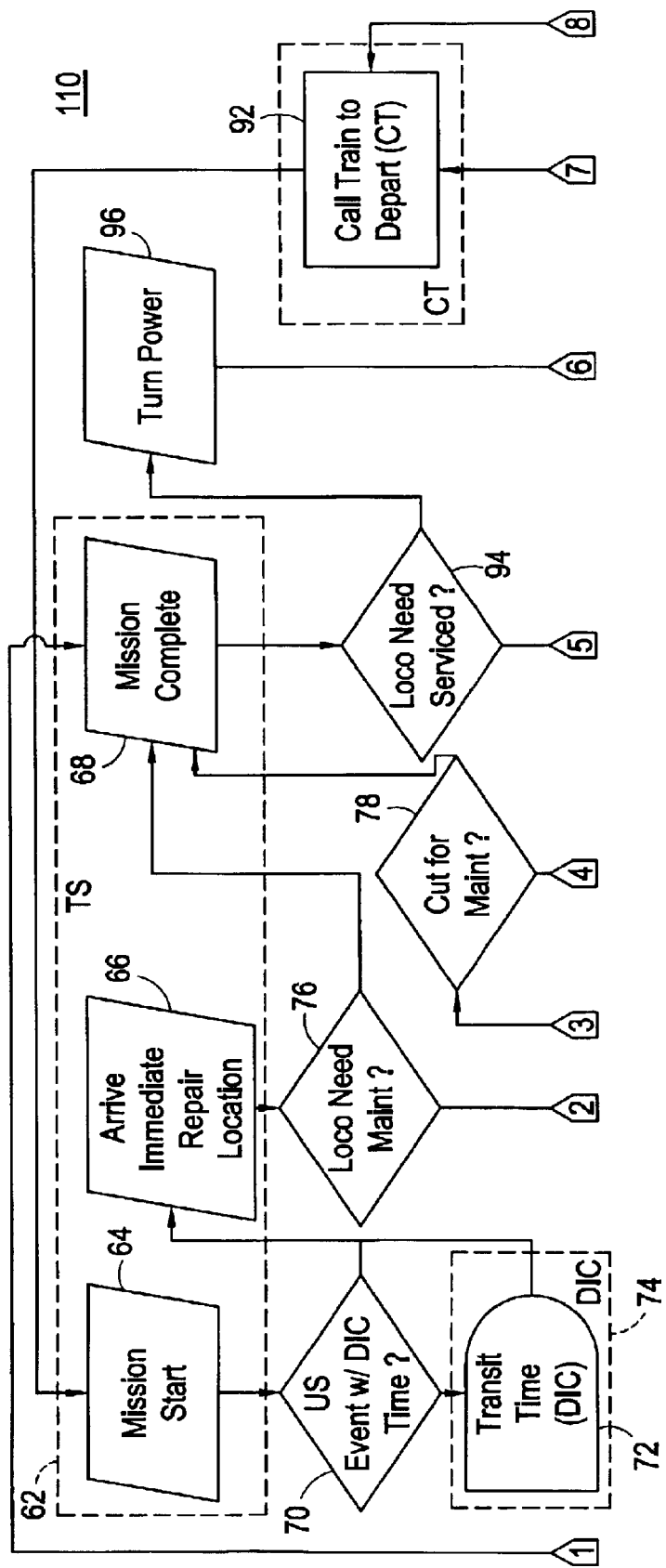
FIG. 4A is a portion of a flow diagram of another exemplary embodiment of a method for managing the use, maintenance and repair of a fleet of mobile assets.
Figure 4B:
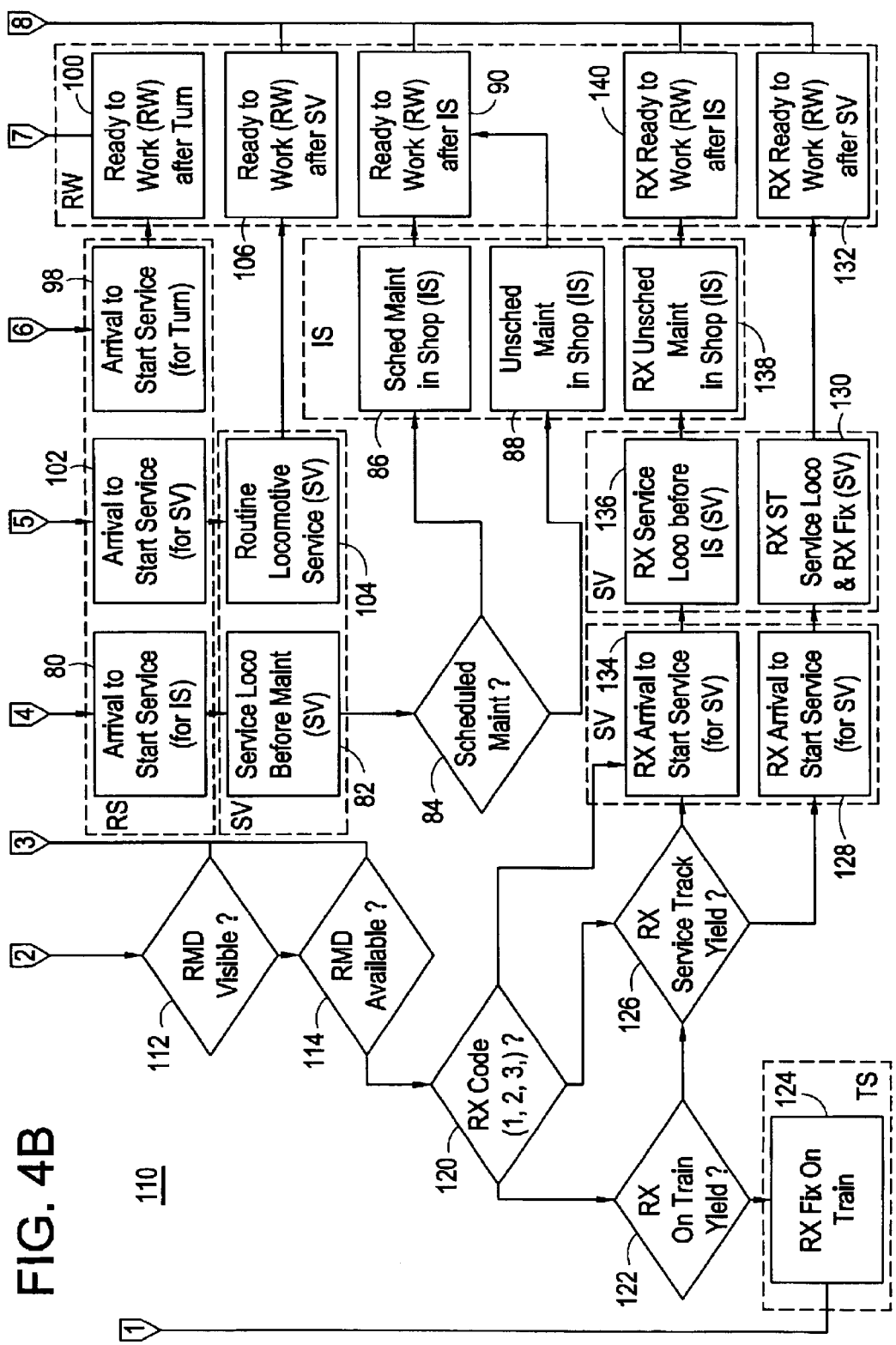
FIG. 4B is a continuation of the diagram of FIG. 4A.

FIG. 4 illustrates an exemplary embodiment of a method for managing the use, maintenance and repair of a fleet of mobile assets in one aspect of the present invention and is generally referred to as utilization model 110. The method of FIG. 4 depicts the utilization process map 60 of FIG. 3 and the steps associated with remotely monitoring and diagnosing the systems, subsystems and/or other components of a locomotive or fleet of locomotives, such as locomotive 10, while in operation. One aspect of the present invention allows for data indicative of operational parameters associated with the systems, subsystems and/or other components of locomotive 10 to be monitored, collected and/or analyzed for diagnostic purposes either on-board the locomotive 10 and/or remotely. For example, these functions may be performed by the on-board system 55 and by appropriately configured hardware and software remote from the locomotive 10 such as the processor 53 and database 51 located at the MDSC 52, for example. It will be recognized by those skilled in the art that the remote capability does not have to reside in the service yard 44 as depicted in FIG. 2 but may reside virtually anywhere worldwide. The remote monitoring and diagnostic aspects of the present invention provide functionality to remotely monitor aspects of the locomotive's 10 operation by collecting a wide range of on-board sensor data, for example, from a locomotive 10 through methods known in the art.

Referring to FIG. 4, step 76 allows for determining whether the locomotive 10 needs maintenance at the intermediate repair location of step 66. If no maintenance is required in step 76 then the locomotive 10 may proceed to mission complete in step 68. If the locomotive 10 needs maintenance then step 112 allows for determining whether the remote monitoring and diagnostics ("RMD") functionality is visible for a particular failure mode associated with the locomotive 10. For example, locomotive 10 may include an on-board monitoring and diagnostics system 55 that may include a plurality of sensors for observing certain failure modes associated with the locomotive's 10 systems, subsystems and/or other components. Data indicative of the operational parameters associated with the detected failure mode or modes may be diagnosed by the on-board system 55 and/or transmitted for diagnosis to a remote facility such as the MSDC 52, for example. The on-board system 55 and/or the remote system at the MDSC 52 may diagnose a failure mode's data to determine whether a recommended fix instruction needs to be issued. RMD visible refers to those failure modes that can be observed by the on-board sensor signals and recognized by RMD. If a failure mode is not RMD visible in step 112 then go to step 78 to determine whether the locomotive 10 needs to be cut for maintenance. If the locomotive 10 does not require to be cut then the locomotive 10 may proceed to mission complete step 68, otherwise go to step 80.

If a problem is identified with a locomotive 10 while in operation then artificial intelligence tools developed by the assignee of the present invention or commercially available may be used to analyze collected data to identify specific failures of a system, subsystem and/or other component of locomotive 10. One aspect of the present invention allows for the diagnostic analysis to be performed on-board locomotive 10 by the system 55 and/or remotely by the MDSC 52. The completed diagnosis may be conveyed or transmitted to personnel at the service yard 44 to inform them of the repair, maintenance and/or servicing needed in response to the completed diagnosis and to alert them that the locomotive 10 may be coming in for servicing. This early warning and data transfer is advantageous in that it allows the personnel to schedule events associated with the locomotive's 10 arrival at service yard 44 including at least, for example, what repair, maintenance and/or other services will be performed, where they will be performed and who will perform them. Other events and activities may also be planned such as, for example, obtaining parts from the parts requisition center 54, assessing customer information acquired from the customer center 56 pertaining to the particular locomotive 10 and the impending work to be performed for that customer, projecting how long it will take to perform the work and scheduling the locomotive's 10 return to utilization. Providing remote monitoring and diagnostic data to personnel at the service yard 44 allows for the locomotive's utilization to be maximized. Another advantage is that the MDSC 52 may isolate problems and enable certain repairs to be performed at the "service track" and/or "run-thru" locations of the service yard 44 that otherwise would have been performed "in-shop" thereby improving the locomotive's 10 utilization. Such problem isolation may also allow certain repairs that would otherwise have been performed at the "service track" location to be moved to the "run-thru" location. These advantages may increase the amount of time a locomotive 10 is utilized.

FIG. 4 further illustrates that if no maintenance is needed in step 76 then locomotive 10 may proceed to step 78 and from there to step 68 mission complete and ultimately return to step 64 mission start as previously described. If the RMD is visible in step 112 then step 114 allows for determining whether the RMD is available. The RMD is available if both the on-board system 55 of a locomotive, such as locomotive 10, and remote system such as the remote monitoring and diagnostic system 53, 51 at the MDSC 52, for example, are operational and available to be used for an event associated with locomotive 10. If the RMD is not available then locomotive 10 may proceed to step 78 and from there to step 68 mission complete and ultimately return to step 64 mission start as previously described, or to step 80 if the locomotive 10 needs to be cut from the train to complete the needed maintenance service. If RMD is available in step 114 then step 120 allows for the remote monitoring and diagnostics to determine whether an RX Code is equal to 1, 2 or 3 associated with the locomotive's 10 problem being analyzed. The RX Code may be indicative of whether locomotive 10 will be transported to the a) "run-thru", b) "service track" and/or c) "in-shop" locations of the service yard 44 for repair, maintenance and/or other types of service. In one exemplary embodiment the RX Code 1 may be set for "run-thru" where the work is performed with the locomotive 10 still "On Train"; RX Code 2 may be set for "service track"; and RX Code 3 may be set for "in-shop". Whether locomotive 10 should be transported to the location associated with RX Code 1, 2 and/or 3 may be determined by predetermined criteria applied to the data collected by the on-board system 55 and/or the MDSC 52 that is associated with locomotive's 10 problem condition. For example, problems that take two (2) hours or less to fix may be done at the "run-thru" location; heavy repairs such as overhauls, replacing the engine or traction motor, for example, need to be done at the "in-shop" location due to the availability of tools and facilities; multiple repairs may also be performed more efficiently at the "in-shop" location and most other services may be performed at the "service track" location. In alternate embodiments, step 120 may allow for determining a priority of RX Codes in the event that multiple problems are diagnosed with locomotive 10. In this respect, subsequent steps in the flow diagram may be adjusted in response to the prioritization as will be recognized by one skilled in the art. A set or sets of data indicative of one or more failure modes of the locomotive 10 may be transmitted from the locomotive 10 to the MDSC 52 and/or service yard 44 in step 114.

Subsequent to step 120, step 122 allows for determining the RX Code 1 or On-Train Yield. The On-Train Yield may be the percentage of RX Code 1 recommendations ("run-thru") that were actually executed as "run-thru" where locomotive 10 remains "On-Train" when the work is being performed. For example, if an RX Code 1 is determined in step 120 then service yard 44 personnel may attempt to execute the associated fix recommendation at a "run-thru" location with the locomotive 10 still "On-Train". If they do so successfully then step 124 allows for an RX Fix On-Train to be designated and the locomotive 10 may then proceed to complete its mission in step 68. If the service yard 44 personnel are not able to execute the fix recommendation at the "run-thru" location in step 122 then step 126 allows for determining RX Service Track Yield. The RX Service Track Yield may be the percentage of RX Code 2 recommendations ("service track") that were actually executed as "service track". Locomotives originally classified as RX Code 1 but that were unable to be executed as such may be used to calculate the percentage. If a locomotive 10 can be executed as "service track" then the locomotive 10 may be transported in step 128 to a "service track" location for execution of the recommended fix instruction. Step 130 allows for RX ST Service Loco and RX Fix, which allows for the maintenance work to be performed on the locomotive 10 at the "service track", and for serving the locomotive 10. The locomotive 10 may then be transported in step 132 to a location of service yard 44, for example, where it may be designated as being RX Ready to Work after SV. The RX Ready to Work after SV status of the locomotive 10 may then be communicated to personnel at the MDSC 52 or other personnel responsible for scheduling the locomotive's 10 return to work. Step 92 allows for the locomotive 10 to receive a Call Train to Depart ("CT") signal and/or communication and the locomotive 10 may be transported in step 64 to a mission start location to begin a new mission. If in step 126 it is determined that the execution of an originally classified RX Code 1 and/or RX Code 2 locomotive 10 may not be serviced at the "service track" location then that locomotive 10 may be transported in step 134, RX Arrival to Start Service, to a location for servicing prior to being transported for In-Shop Service ("IS") in step 138. Step 136 allows for the locomotive 10 to be serviced before going to the RX Unscheduled Maintenance In-Shop Service status in step 138. After receiving in-shop service the locomotive 10 may transported in step 140 to a location of the service yard 44, for example, where it may be classified as being RX Ready to Work after IS. The RX Ready to Work after IS status of the locomotive 10 may then be communicated to personnel at the MDSC 52 or other personnel responsible for scheduling the locomotive's 10 return to work. Step 92 allows for the locomotive 10 to receive a Call Train to Depart ("CT") signal and/or communication and the locomotive 10 may be transported to a mission start location to begin a new mission in step 64.

Figure 5A:
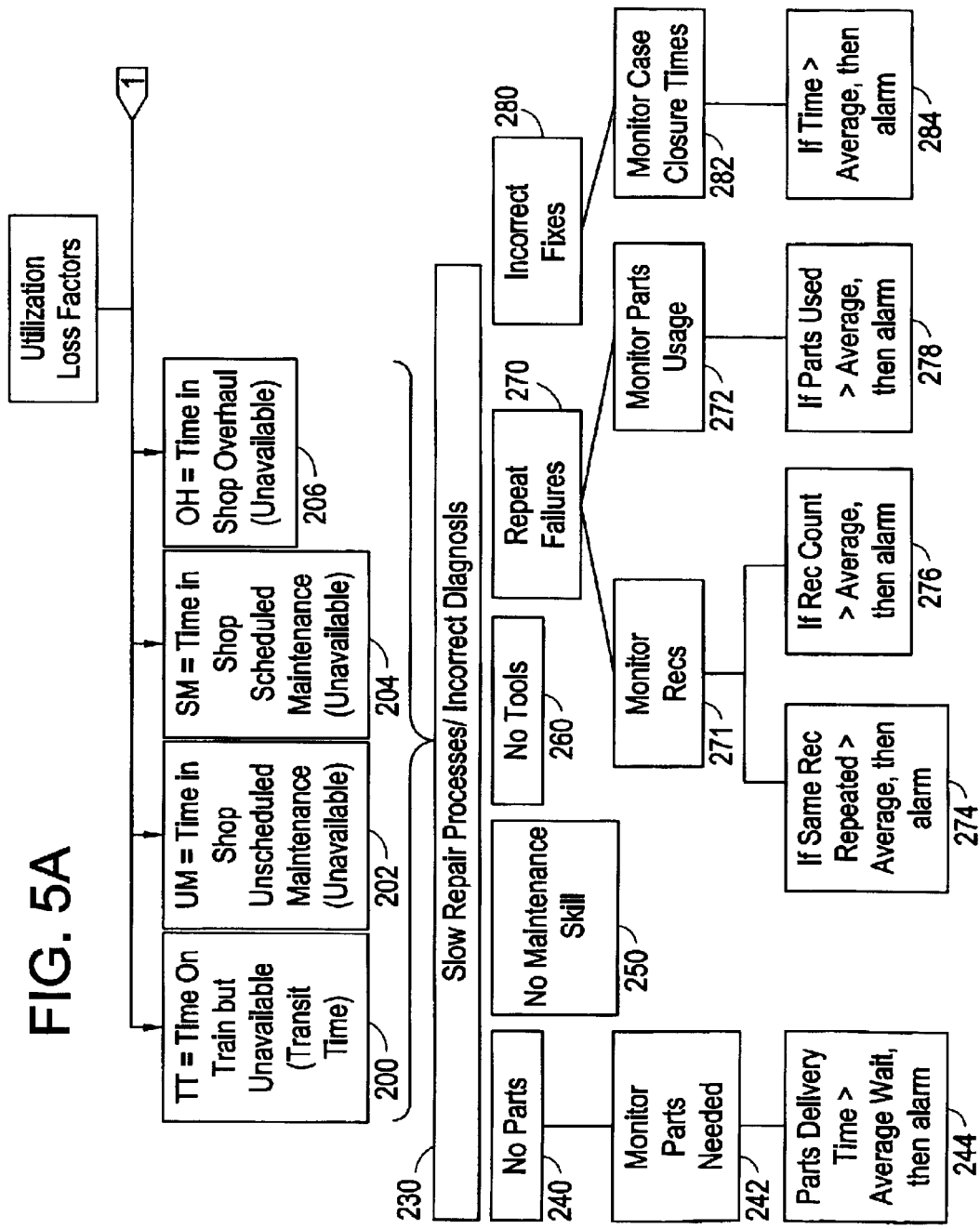
FIG. 5A is a portion of a diagram depicting exemplary utilization loss factors and exemplary steps for monitoring those loss factors and providing notice.
Figure 5B:
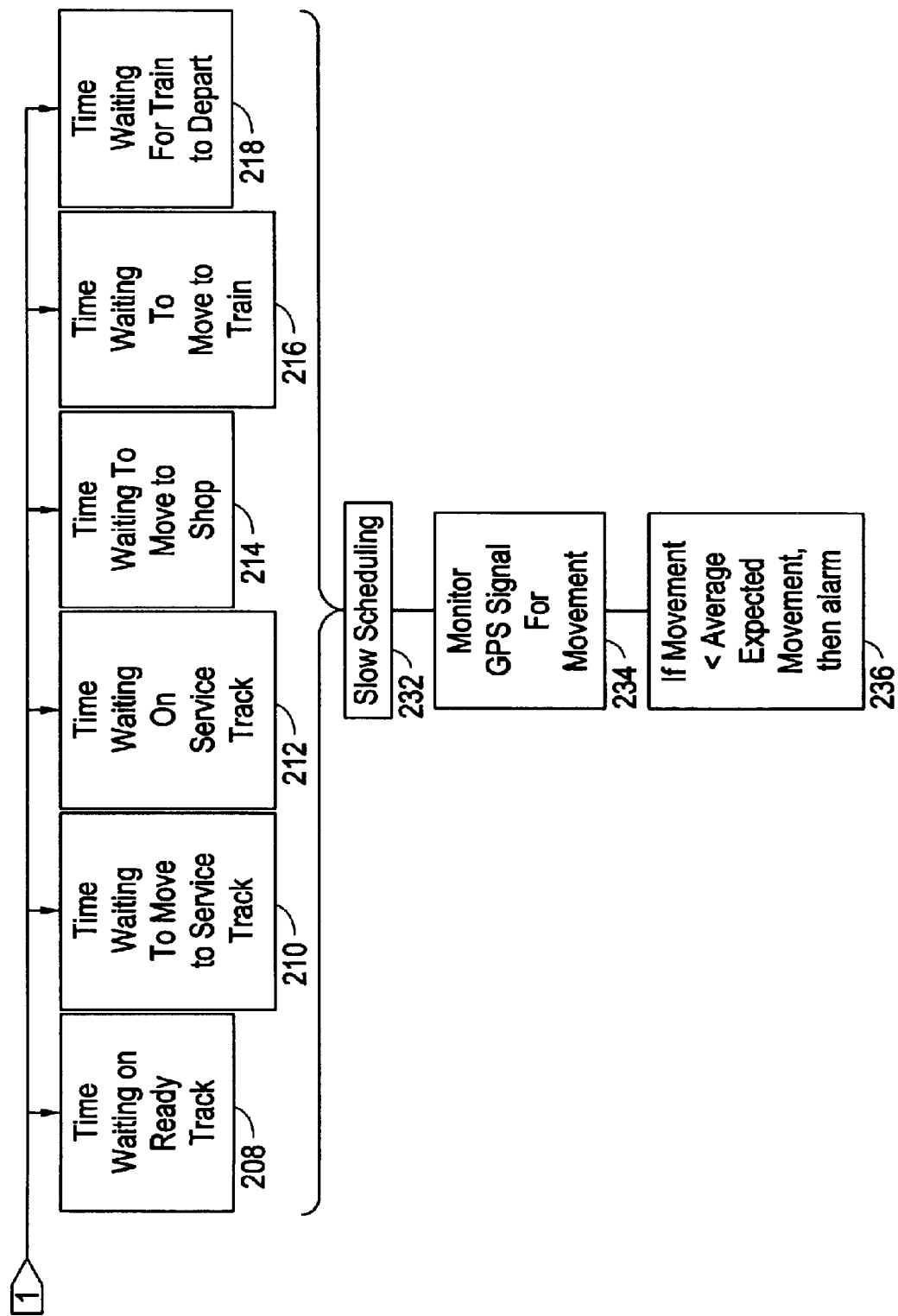
FIG. 5B is a continuation of the diagram of FIG. 5A.
Figure 6A:
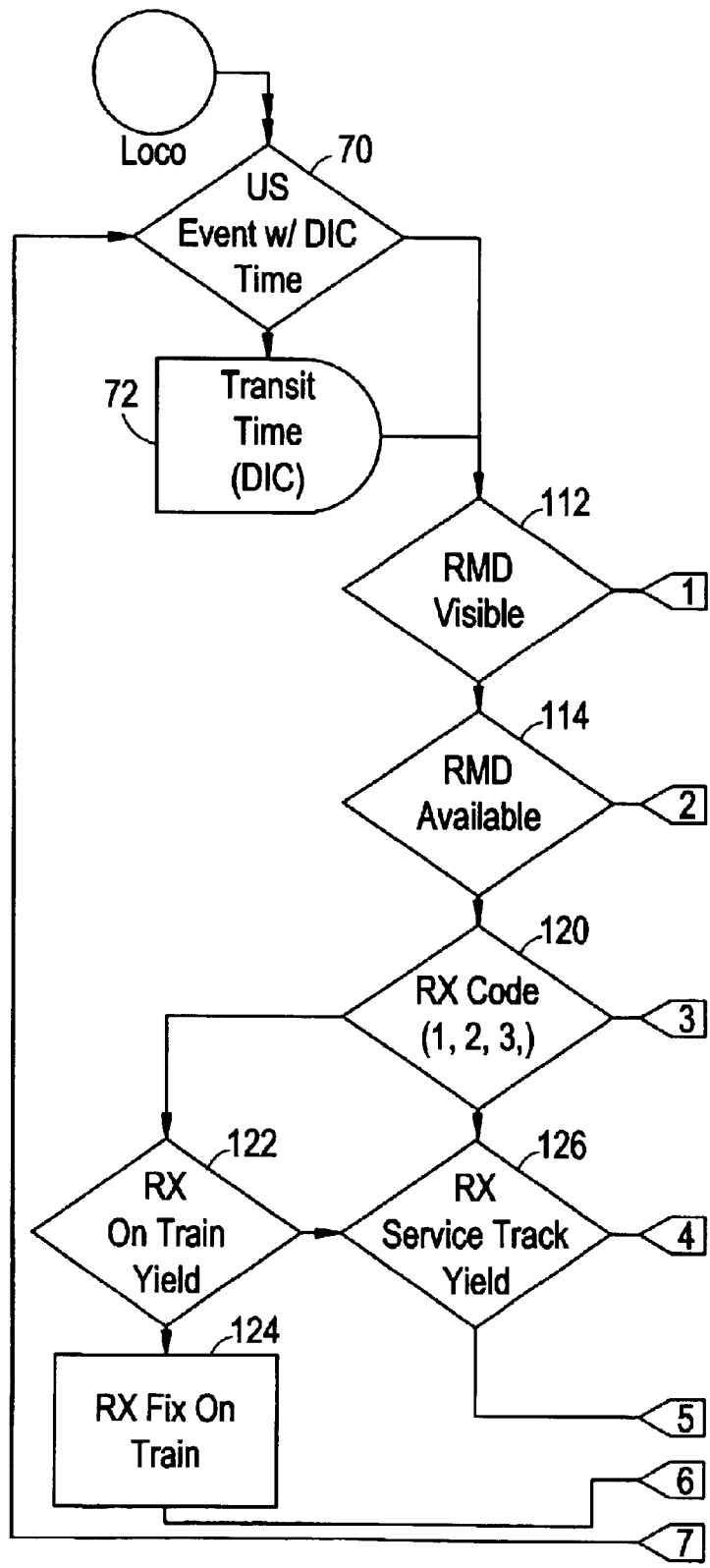
FIG. 6A is a portion of a flow diagram of another exemplary embodiment of a method for managing the use, maintenance and repair of a fleet of mobile assets.

Maximizing the utilization of a vehicle such as locomotive 10 may require the monitoring of various events and activities such as those depicted in FIGS. 3, 4 and 6, for example. These events and activities may include the locomotive's use and/or transitioning through various stages of servicing procedures performed on locomotive 10, which may include for example, a repair procedure, maintenance procedure or other service operations. Schedules may be established for events associated with respective servicing procedures for the timely completion of the respective servicing procedure. For example, FIG. 5 depicts a set of exemplary utilization loss factors and exemplary steps associated with those factors for monitoring the progression of locomotive 10 at various stages of its useful life such as during servicing procedures. The utilization loss factors are associated with some of the stages or phases a locomotive 10 would move through while being repaired, maintained and/or serviced. The utilization loss factors as used herein may include conditions and/or events associated with an asset, such as locomotive 10, that cause or may cause the asset to become unavailable for its intended use or available but in a diminished capacity. The utilization loss factors may be associated with respective servicing procedures and events pertaining to those procedures such that the respective utilization loss factor could delay the timely completion of servicing locomotive 10. In one aspect exemplary steps are provided for providing notice that a respective utilization loss factor is likely to cause delay in the timely return of locomotive 10 to operation unless corrective action is taken. Such notice may be provided in response to the occurrence of one or more specific conditions and/or events associated with a respective servicing procedure. Providing notice may be accomplished in various ways such via email, posting the notice for access over the Internet, instant messaging, triggering warning alarms and/or other means of data delivery indicative of the notice. If a utilization loss factor is identified as being likely to cause delay in the timely return of locomotive 10 to operation then the notice allows for corrective actions to be taken by personnel at the service yard 44, for example. The corrective actions may prevent the locomotive 10 from being unutilized or underutilized such as by being delayed in its return to operation. The utilization loss factors illustrated in FIG. 5 may be associated with events depicted in the utilization process map 60 shown in FIG. 3. The utilization loss factors may be indicative of the reasons why an expected scope of work, such as a repair or maintenance procedure for example, was not completed as planned at a particular location or locations such as due to the lack of skilled labor. Those skilled in the art will recognize that other utilization loss factors may be defined. For example, a utilization loss factor may pertain to the performance characteristics of locomotive 10 such as a fuel consumption rate, a volume of lubricant used, the amount of time between lubricant changes or other routine maintenance procedures.

One exemplary embodiment of the present invention allows for defining a set of utilization loss factors 200, 202, 204 and 206 associated with a Slow Repair Process/ Incorrect Diagnosis algorithm, referenced in general as 230. The Slow Repair Process/Incorrect Diagnosis algorithm 230 allows for monitoring the utilization loss factors 200 through 206 and generating one or more notices or alarms if certain conditions are met. It will be recognized by those skilled in the art that various algorithms may be used to implement at least these aspects of the present invention. Factor 200 may be defined as TT=Time On-Train but Unavailable and pertain to that period of time when a locomotive 10 remains connected to a train consist but is in transit to or from the service yard 44, for example, for repair, maintenance and/or service. Factor 202 may be defined as UM=Time in Shop Unscheduled Maintenance and pertain to that period of time when a locomotive 10 is in a shop at the service yard 44, for example, for maintenance that is not part of a regularly scheduled maintenance program. Factor 204 may be defined as SM=Time in Shop Scheduled Maintenance and pertains to that period of time when a locomotive 10 is in the shop at the service yard 44, for example, for maintenance that is part of a regularly scheduled maintenance program. Factor 206 may be defined as OH=Time in Shop Overhaul and pertains to that period of time a locomotive 10 is in the shop at the service yard 44, for example, for a regularly scheduled overhaul. An overhaul may include a wide range of scheduled and/or unscheduled major repairs to and/or maintenance of locomotive 10 that require it to be taken out of service. The locomotive 10 may be classified as being unavailable during those times defined by factors 200, 202, 204 and 206. A locomotive 10 may be classified as unavailable when it is not mechanically ready to pull a train.

The periods of time defined by the utilization loss factors 200, 202, 204 and 206 may be monitored by the Slow Repair Processes/incorrect Diagnosis algorithm 230 to determine if certain conditions are met and/or events occur thereby activating a notice being transmitted to appropriate personnel. One aspect of the present invention allows for the Slow Repair Processes/incorrect Diagnosis algorithm 230 to monitor each of the utilization loss factors 200, 202, 204 and 206 by monitoring a second set of utilization loss factors that may be events and/or conditions associated with, and that may affect one or more of the utilization loss factors 200, 202, 204 and/or 206. As shown in FIG. 5, such conditions and/or events may include a No Parts component 240, a No Maintenance Skill component 250, a No Tools component 260, a Repeat Failures component 270 and an Incorrect Fixes component 280, for example. The No Parts component 240 may include step 242 for monitoring the parts needed for repair, maintenance and/or service of locomotive 10 during the periods of time defined by factors 200 through 206. Step 244 allows for activating an alarm if it is determined that the parts delivery time is greater than an average wait time for parts delivery. The average wait time for parts delivery may be determined based on historical data associated with activities the same as or similar to the activities defined by factors 200 through 206. The alarm of step 244 may inform personnel at the service yard 44 that no parts are available and/or that parts are taking longer than expected to arrive at the service yard 44 for work being done to a locomotive 10. An alternate embodiment allows for an alarm or notice to be provided in step 244 if, for example, the original schedule for the delivery of parts is modified as a function of changes to the diagnostics method used to generate a fix recommendation and/or if the wrong parts are ordered or delivered. Service yard 44 personnel may investigate the cause of the alarm and take corrective action. Corrective action may include, for example, parts substitutions, ensuring expedited delivery, rescheduling non-critical repairs, maintenance and/or other servicing, or rescheduling that locomotive's 10 return to service in response to the parts delay.

Components 250 and 260, respectively, allow for an alarm to be activated if personnel at the service yard 44 do not have the necessary maintenance skills for performing the required maintenance and/or if the service yard 44 does not have the tools necessary for performing the maintenance. An alarm activated in 250 and/or 260 may alert service yard 44 personnel that these events have occurred so the personnel may take appropriate corrective action. The Repeat Failures component 270 may branch into step 271 for monitoring the total number of a fix recommendations, the total number of a specific fix recommendation and/or the success rate of those fix recommendations. Fix recommendations may be provided by an MDSC 52 expert, for example. Step 272 allows for monitoring parts usage that may include, for example, the type and quantity of parts used for a recommended fix or that are associated with a recommended fix in that a part may affect the solution to a recommended fix. If the recommendation for a fix delivered by the MDSC 52 expert is repeated for subsequent servicing events for a specific locomotive 10 more times than an average number of times when compared to historical data of a fleet of locomotives, for example, then step 274 allows for activation of an alarm. Similarly, if the number of recommended fixes for a particular locomotive 10 is greater than an average number of recommended fixes for a predetermined population or fleet of locomotives then step 276 allows for activation of an alarm. Alarms activated in steps 274 and/or 276 may alert service personnel that the particular locomotive 10 may need to undergo additional diagnostics to determine why that locomotive 10 is experiencing above average events defined in steps 274 and 276 respectively. Step 278 allows for activation of an alarm if the number of parts used for a particular locomotive is greater than the average number of parts used for a predetermined population or fleet of locomotives, for example. Step 282 allows for monitoring the amount of time it takes to complete or close a discrete or set of repair, maintenance and/or servicing events. Step 284 allows for activation of an alarm if the monitored amount of time for closing the repair, maintenance and/or servicing event is greater than an average closure time for a predetermined population of identical or similar events. Alarms activated in steps 278 and/or 284 may alert service yard 44 personnel, for example, that a particular locomotive 10 is experiencing events that deviate from established averages and/or standards. Alarms activated in steps 274, 276, 278 and/or 284 may also inform personnel of the need to conduct further diagnosis and/or evaluation of that locomotive 10 to determine whether its systems, subsystems and/or other components may be defective or otherwise malfunctioning thereby causing the repeated incidents identified in these steps.

Another aspect of the present invention allows for utilization loss factors 208, 210, 212, 214, 216 and 218 to be defined and used with a Slow Scheduling algorithm, referenced in general as 232. The Slow Scheduling algorithm 232 allows for monitoring events defined by these utilization loss factors and for generating one or more notices or alarms if certain conditions are met. It will be recognized by those skilled in the art that various algorithms may be used to implement at least these aspects of the present invention. In one exemplary embodiment, the Slow Scheduling algorithm 232 may include step 234, as shown in FIG. 5, for monitoring the movement of locomotive 10 such as by monitoring global positioning satellite ("GPS") signals of a locomotive 10 to detect its movement during the periods of time defined by the utilization loss factors 208 through 218. Each locomotive 10 may be equipped with appropriate GPS equipment to transmit a signal to a conventional receiving unit that may be placed proximate to the MDSC 52, for example. Step 236 allows for the activation of an alarm if the movement of a locomotive 10 being repaired, maintained and/or serviced from one position to another does not occur within a predetermined expected time period or at a preselected time, for example. For instance, utilization loss factor 208 allows for monitoring the period of time a locomotive waits on a ready track. The ready track may be the location a locomotive 10 waits to be put On-Train after repair, maintenance and/or service has been performed. Factor 210 allows for monitoring the period of time a locomotive 10 waits to move from the ready track or another designated location to a service track location. The period of time a locomotive 10 waits on the service track after work to locomotive 10 is completed is monitored by factor 212. Factor 214 allows for monitoring the period of time a locomotive 10 waits to move from a designated position, such as the service track for example, to a service shop. Factor 216 allows for monitoring the period of time a locomotive 10 waits to move from a designated position, such as the service shop for example, to a position on the tracks where it can be connected with a train. The period of time the train waits to depart may be monitored by factor 218. Factors 208 through 218 are indicative of the amounts of time the locomotive 10 waits at a location before moving to another location. It will be recognized by those skilled in the art that the period of time a locomotive waits for other events and/or conditions in the repair, maintenance, servicing or transit process may be monitored in the Slow Scheduling algorithm 232.

The alarms or notices activated by the Slow Repair Processes/Incorrect Diagnosis algorithm 230 and the Slow Scheduling algorithm 232 may be logged by a utilization monitoring system, which may be part of the processor 53 and database 51 at the MDSC 52, for example. The logged alarms may be continuously monitored by an MDSC 52 expert and/or transmitted remotely to another end user, for example. As the alarms are logged, the MDSC 52 expert may monitor the alarms then notify personnel at the service yard 44 that a loss of utilization event associated with a locomotive 10 has occurred or is about to occur if corrective action is not taken. The service yard 44 personnel may then take corrective action to ensure that a loss of utilization will not occur and/or minimize its impact on the operation of the locomotive 10. Many of these steps may be taken in response to a set of data indicative of a failure mode of the locomotive 10 received from the locomotive 10 while it is still remote from the service yard 44. For example, if personnel determine that a specific part is needed in response to the failure mode then steps may be taken to ensure that part is available on time to perform the work on the locomotive 10 as scheduled in the service yard 44. One aspect allows for monitoring such events and/or conditions to determine when they occur relative to a schedule established for the timely completion of a respective service procedure. A database of events and/or conditions, such as database 51 for example, may be provided that are associated with respective servicing procedures. The events and/or conditions may be indicative of a status of completion of the procedures or may be necessary for the completion of the procedure. If the event and/or condition is late then a notice may be provided that the associated utilization loss factor is likely to cause delay in the timely return of the locomotive 10 to operation.

FIG. 6 illustrates another exemplary embodiment of the utilization model 110 shown in FIG. 4. Step 150 allows for locomotive 10 to be called to depart after work on locomotive 10 is completed in step 140 or step 132. During transport of the locomotive 10 after being called to depart step 152 allows for determining whether locomotive 10 needs to repeat the repair, maintenance and/or servicing process due to an inaccurate diagnosis. If it is determined that an inaccurate diagnosis has occurred then the locomotive 10 may return to step 70 where a new diagnostic process may commence. If the diagnosis is not inaccurate then step 154 allows for determining whether locomotive 10 needs to repeat the repair, maintenance and/or servicing process due to an inaccurate execution of a recommended fix instruction. If the execution is inaccurate then the locomotive 10 may return to step 70 where a new diagnostic process may commence. If the execution is not inaccurate then step 154 allows for the locomotive 10 to proceed to an end step 155 or to start a new mission in step 64, for example. Similarly, step 156 allows for determining whether a failure is repeated after the locomotive 10 is called to depart in step 92. If the failure does not repeat then the locomotive 10 may proceed to start a new mission in step 64. If the failure does repeat then the locomotive 10 may return to step 70 to begin a new diagnostic procedure.

The electronic data delivery and exchange aspects of the present invention provides in one aspect thereof an improvement in the diagnosis, repair, maintenance and/or servicing of a mobile asset such as the locomotive 10 by applying E-business technologies to replace the prior manual paper-based processes. A benefit derived from applying these technologies includes improved availability of the mobile asset, such as locomotive 10, by reducing the cycle time of the repairs, maintenance and/or servicing events and more efficient and focused associated processes.

The present invention can be embodied in the form of computer-implemented processes and apparatus for practicing those processes. The present invention can also be embodied in the form of computer program code including computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. When implemented on a computer, the computer program configures the computer to create specific logic circuits or processing modules.

While the preferred embodiments of the present invention have been shown and described herein, it will be obvious that such embodiments are provided by way of example only. Numerous variations, changes and substitutions will occur to those skilled in the art without departing from the invention herein. Accordingly, it is intended that the invention be limited only by the spirit and scope of the appended claims.

What is claimed is:

1. A method of servicing a locomotive subject to utilization loss factors delaying the completion of servicing the locomotive and the timely return of the locomotive to operation, the method comprising:

identifying at least one utilization loss factor that could delay the timely completion of servicing the locomotive;

identifying a service procedure for the locomotive associated with at least one utilization loss factor;

accessing a database storing information with respect to at least one event associated with the service procedure indicative of a status of completion of the procedure, wherein the service procedure requires testing of the locomotive after servicing to confirm operability of the serviced locomotive;

establishing a schedule for the at least one event for the timely completion of the service procedure, wherein the at least one event includes a successful test;

monitoring said at least one event to determine when the event occurred relative to said scheduled time, wherein the scheduled time includes the time for the completion of the successful test; and if the at least one event is late, providing notice that the relevant utilization loss factor is likely to cause delay in the timely return of the locomotive to operation unless corrective action is taken.

2. The method of claim 1 wherein a utilization loss factor is an amount of time that the locomotive is in transit to a locomotive servicing site and is unavailable for productive operation.

3. The method of claim 1 wherein a utilization loss factor is an amount of time that the locomotive is at a locomotive servicing site for unscheduled maintenance.

4. The method of claim 1 wherein a utilization loss factor is an amount of time that the locomotive is at a locomotive servicing site for scheduled maintenance.

5. The method of claim 1 wherein a utilization loss factor is an amount of time the locomotive is at a locomotive servicing site for a major overhaul.

6. The method of claim 1 wherein the service procedure requires the use of parts that are not available at a locomotive servicing site for the locomotive, wherein said at least one event associated with the procedure is the delivery of said parts to the site and wherein the scheduled time is the time at which the parts are to be available for use.

7. The method of claim 1 wherein the service procedure requires the use of skilled personnel that are not available at a locomotive servicing site for the locomotive, wherein said at least one event associated with the procedure is the arrival of said personnel to the site and wherein the scheduled time is the time at which the personnel are to be available for performance of the service procedure.

8. The method of claim 1 wherein the service procedure requires the use of tools that are not available at a locomotive servicing site for the locomotive, wherein said at least one event associated with the procedure is the delivery of said tools to the site and wherein the scheduled time is the time at which the tools are to be available for use.

9. The method of claim 1 further comprising:

providing a processor configured for analyzing data indicative of the testing of the locomotive after service to determine whether the test is successfully completed.

10. The method of claim 1 further comprising:

providing a processor configured to determine whether the at least one event is late.

11. The method of claim 1 further comprising:

providing a processor configured to generate a notice that the relevant utilization loss factor is likely to cause delay in the timely return of the locomotive to operation unless corrective action is taken.

12. The method of claim 1 wherein the at least one event is the delivery to a locomotive servicing site of parts needed to perform the service procedure, the method further comprising:

monitoring the delivery of the parts to the locomotive servicing site; and wherein the delivery of the parts is late if the scheduled time for delivery of the parts to the locomotive service site exceeds an average wait time for delivery of the parts to the locomotive service site.

13. A method of servicing a locomotive subject to utilization loss factors delaying the completion of servicing the locomotive and the timely return of the locomotive to operation, the method comprising:

identifying at least one utilization loss factor that could delay the timely completion of servicing the locomotive;

identifying at least one service procedure for the locomotive associated with at least one utilization loss factor;

accessing a database storing information with respect to at least one condition associated with the service procedure that is needed at a locomotive servicing site for the timely completion of the service procedure;

monitoring the at least one condition in preparation of the initiation of the respective service procedure to confirm that the at least one condition has been met;

comparing conditions stored in the database to the monitored conditions to determine if a condition is not met; and if the at least one condition is not met, providing notice that the relevant utilization loss factor is likely to cause delay in the timely return of the locomotive to operation unless corrective action is taken.

14. The method of claim 13 wherein a utilization loss factor is an amount of time that the locomotive is in transit to a locomotive servicing site and is unavailable for productive operation.

15. The method of claim 13 wherein a utilization loss factor is an amount of time that the locomotive is at a locomotive servicing site for unscheduled maintenance.

16. The method of claim 13 wherein a utilization loss factor is the amount of time that the locomotive is at a locomotive servicing site for scheduled maintenance.

17. The method of claim 13 wherein a utilization loss factor is the amount of time the locomotive is at a locomotive servicing site for a major overhaul.

18. The method of claim 13 wherein the at least one condition includes availability of key parts of the locomotive for performance of a respective servicing procedure.

19. The method of claim 13 wherein the at least one condition includes availability of skilled personnel for performing a respective servicing procedure.

20. The method of claim 13 wherein the at least one condition includes availability of tools needed for a respective servicing procedure.

21. The method of claim 13 further comprising:

providing a processor configured to generate a notice that the relevant utilization loss factor is likely to cause delay in the timely return of the locomotive to operation unless corrective action is taken.

22. A method of servicing a locomotive subject to utilization loss factors delaying the completion of servicing the locomotive and the timely return of the locomotive to operation, the method comprising:

identifying at least one utilization loss factor that could delay the timely completion of servicing the locomotive;

identifying a service procedure for the locomotive associated with at least one utilization loss factor;

accessing a database storing information with respect to at least one event associated with the service procedure indicative of an incorrect diagnosis of the servicing required to return the locomotive to service;

monitoring the event to determine the number of times it occurs; and if the number of times the event occurs is greater than a predetermined number, providing notice that the relevant utilization loss factor is likely to cause delay in the timely return of the locomotive to operation unless corrective action is taken.

23. The method of claim 22 wherein a utilization loss factor is an amount of time that the locomotive is in transit to a locomotive servicing site and is unavailable for productive operation.

24. The method of claim 22 wherein a utilization loss factor is an amount of time that the locomotive is at a locomotive servicing site for unscheduled maintenance.

25. The method of claim 22 wherein a utilization loss factor is an amount of time that the locomotive is at a locomotive servicing site for scheduled maintenance.

26. The method of claim 22 wherein a utilization loss factor is an amount of time the locomotive is at a locomotive servicing site for a major overhaul.

27. The method of claim 22 wherein the event comprises a number of times a predetermined recommendation of service for the locomotive is repeated.

28. The method of claim 22 wherein the event comprises a total number of times recommendations for service for the locomotive are repeated.

29. The method of claim 22 wherein the event comprises a repetition of replacement of a key part of the locomotive.

30. The method of claim 22 wherein the event is a repeated failure of the locomotive.

31. The method of claim 30 further comprising:

monitoring a set of recommended fixes associated with the locomotive;

determining whether the same recommended fix is repeated more time than an average number of recommended fixes; and if the same recommended fix repeats more times than the average number of times, providing notice that the relevant utilization loss factor is likely to cause delay in the timely return of the locomotive to operation unless corrective action is taken.

32. The method of claim 30 further comprising:

monitoring a set of recommended fixes associated with the locomotive;

determining whether a total recommended fix count is greater than an average recommended fix count; and if the total recommended fix count is greater than the average recommended fix count, providing notice that the relevant utilization loss factor is likely to cause delay in the timely return of the locomotive to operation unless corrective action is taken.

33. The method of claim 30 further comprising:

monitoring a usage of parts associated with the locomotive;

determining whether the usage of parts is greater than an average usage of parts; and if the usage of parts is greater than the average usage of parts, providing notice that the relevant utilization loss factor is likely to cause delay in the timely return of the locomotive to operation unless corrective action is taken.

34. The method of claim 22 wherein the at least one event is an incorrect fix of the locomotive, the method further comprising:

monitoring an amount of time it takes to correctly fix a problem associated with the locomotive;

determining whether the amount of time is greater than an average amount of time; and if the amount of time is greater than the average amount of time, providing notice that the relevant utilization loss factor is likely to cause delay in the timely return of the locomotive to operation unless corrective action is taken.

35. The method of claim 22 further comprising:

providing a processor configured to generate a notice that the relevant utilization loss factor is likely to cause delay in the timely return of the locomotive to operation unless corrective action is taken.

36. The method of claim 22 further comprising:

providing a processor configured to access the database and compare the at least one event to the monitored event to determine whether the number of times the event occurs is greater than the predetermined number.

37. A method of servicing a locomotive subject to utilization loss factors delaying the completion of servicing the locomotive and the timely return of the locomotive to operation, the method comprising:

identifying at least one utilization loss factor that could delay the timely completion of servicing the locomotive;

identifying a service procedure for the locomotive associated with the at least one utilization loss factor;

accessing a database storing information with respect to at least one event associated with the service procedure requiring the movement of the locomotive to a predetermined location relative to a locomotive servicing site at times set for the occurrence of the at least one event;

monitoring the position of the locomotive relative to the locomotive servicing site and relative to the time set for the event; and if the locomotive is not in the predetermined position at the time set for the event, providing notice that the relevant utilization loss factor is likely to cause delay in the timely return of the locomotive to operation unless corrective action is taken.

38. The method of claim 37 wherein the utilization loss factor is the amount of time spent time waiting for movement of the locomotive to a locomotive servicing site.

39. The method of claim 37 wherein the utilization loss factor is the amount of time spent waiting for movement of the locomotive to a predetermined position within a locomotive servicing site.

40. The method of claim 37 wherein the utilization loss factor is the amount of time spent waiting for movement of the locomotive back to an operational site once servicing is complete.

41. The method of claim 37 wherein the location is determined via a global positioning satellite system.

42. The method of claim 37 further comprising:

providing a processor configured to generate a notice that the relevant utilization loss factor is likely to cause delay in the timely return of the locomotive to operation unless corrective action is taken.

43. The method of claim 37 further comprising:

providing a processor configured to access the database and compare the event to the monitored position of the locomotive to determine if the locomotive is not in the predetermined position at the time set for the event.

44. The method of claim 37, the step of monitoring the position of the locomotive comprising monitoring a GPS signal, the method further comprising:

monitoring the movement of the locomotive during the service procedure;

determining whether the movement of the locomotive is at a rate that is less than an average rate of movement; and if the movement of the locomotive is at a rate that is less than the average rate of movement, providing notice that the relevant utilization loss factor is likely to cause delay in the timely return of the locomotive to operation unless corrective action is taken.

* * * * *